United States Patent
Chilappagari et al.

(10) Patent No.: US 8,875,000 B2
(45) Date of Patent: Oct. 28, 2014

(54) METHODS AND SYSTEMS SYSTEMS FOR ENCODING AND DECODING IN TRELLIS CODED MODULATION SYSTEMS

(75) Inventors: Shashi Kiran Chilappagari, San Jose, CA (US); Xueshi Yang, Cupertino, CA (US)

(73) Assignee: Marvell World Trade Ltd., Hamilton (BM)

( * ) Notice: Subject to any disclaimer, the term of this patent is extended or adjusted under 35 U.S.C. 154(b) by 0 days.

(21) Appl. No.: 13/285,327

(22) Filed: Oct. 31, 2011

(65) Prior Publication Data

US 2012/0110410 A1 May 3, 2012

Related U.S. Application Data

(60) Provisional application No. 61/409,023, filed on Nov. 1, 2010.

(51) Int. Cl.
*H03M 13/00* (2006.01)

(52) U.S. Cl.
USPC ........................................................ 714/776

(58) Field of Classification Search
CPC ... H04L 1/0057; H04L 1/0061; H04L 1/0041; H04L 1/0083; H04L 1/0072
USPC ........................................................ 714/776
See application file for complete search history.

(56) References Cited

U.S. PATENT DOCUMENTS

| | | | | |
|---|---|---|---|---|
| 5,838,729 | A | * | 11/1998 | Hu et al. ........................ 375/265 |
| 7,395,490 | B2 | * | 7/2008 | Richardson et al. .......... 714/779 |
| 8,245,092 | B2 | * | 8/2012 | Kotecha et al. ............... 714/748 |
| 8,396,142 | B2 | * | 3/2013 | Heegard et al. ............... 375/260 |
| 2007/0195907 | A1 | * | 8/2007 | Wang et al. .................... 375/267 |
| 2009/0129484 | A1 | * | 5/2009 | He et al. .................. 375/240.26 |
| 2009/0183048 | A1 | * | 7/2009 | Tzannes et al. ............... 714/752 |
| 2010/0017678 | A1 | * | 1/2010 | Pons et al. ..................... 714/752 |
| 2010/0115358 | A1 | | 5/2010 | Hotecha et al. |

FOREIGN PATENT DOCUMENTS

CN          101123439 A       2/2008

* cited by examiner

*Primary Examiner* — Albert Decady
*Assistant Examiner* — Enam Ahmed (57) ABSTRACT

Systems and methods for encoding and decoding for communications or storage systems utilizing coded modulation are provided. A first portion of data is encoded with a first at least one encoding scheme. A second portion of the data id encoded with a second encoding scheme. A coset is selected from a plurality of cosets based at least in part on the encoded first portion of the data, where the plurality of cosets corresponds to a partition of a signal constellation. A signal vector is selected within the selected coset based at least in part on the encoded second portion of the data.

20 Claims, 6 Drawing Sheets

METHODS AND SYSTEMS SYSTEMS FOR ENCODING AND DECODING IN TRELLIS CODED MODULATION SYSTEMS

CROSS-REFERENCE TO RELATED APPLICATION

This application claims the benefit under 35 U.S.C. §119 (e) of U.S. Provisional Application No. 61/109,023 filed Nov. 1, 2010, which is hereby incorporated by reference herein in its entirety.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The present disclosure relates generally to communications or storage systems and methods, and more particularly, to systems and methods for encoding and decoding for communications or storage systems utilizing coded modulation.

To improve the reliability of communications and storage systems, error control coding is commonly applied to the data that is conveyed or stored. A suitable error correcting code (ECC) can be applied to the data, which adds redundancy to the data stream. If the same throughput of data or storage space is desired in communication/storage, bandwidth expansion is often necessary. Bandwidth expansion refers to an increase in channel bandwidth, typically to allow transmission or storage to occur through the channel with a reduced symbol period or increased storage density. For some channels, especially for those that are low in quality, bandwidth expansion may not be possible or may not be desirable. In these situations, rather than increasing the needed bandwidth, the communication or storage system can utilize modulation schemes with a greater number of signal constellation points. For communications systems, this technique allows for more data to be transmitted at any given time. For example, signaling schemes that double the number of signal constellation points used for transmission, which therefore doubles the amount of data transmitted each symbol period, may produce substantially the same throughput as a signaling scheme that maintains the modulation scheme and doubles the channel bandwidth.

To fully utilize the advantages provided by increasing the number of signal constellation points, the type of modulation and the type of error correcting code should be designed to operate effectively together. This type of data encoding is typically referred to as coded modulation. When a convolutional code is used or the error correcting code, the system implements trellis coded modulation (TCM).

As described above, trellis coded modulation combines coding and modulation to achieve high data rates with little or no signal bandwidth expansion. However, a TCM scheme may leave behind residual errors that may negatively impact the performance of the communications or storage system.

SUMMARY OF THE DISCLOSURE

Systems and methods are provided for encoding and decoding for communications or storage systems utilizing coded modulation.

In one embodiment of the present disclosure, a system for encoding data is disclosed. The system includes control circuitry configured to encode a first portion of the data with a first at least one encoding scheme. In some embodiments, the first at least one encoding scheme includes a first encoding scheme and a trellis encoding scheme. The control circuitry is further configured to encode a second portion of the data with a second encoding scheme. The control circuitry is further configured no select a coset from a plurality of cosets based at least in part on the encoded first portion of the data. The plurality of cosets may correspond to a partition of a signal constellation. The control circuitry is further configured to select a signal vector within the selected coset based at least in part on the encoded second portion of the data.

In some implementations, the first at least one encoding scheme encodes the first portion with a Reed-Solomon Code having a first error correction capability, and the second encoding scheme encodes the second portion with a Reed-Solomon Code having a second error correction capability.

In some implementations, the first error correction capability is greater than the second error correction capability.

In some implementations, the first at least one encoding scheme encodes the first portion of the data into a first plurality of codewords with a Reed-Solomon code having a first error correction capability. The second encoding scheme encodes the second portion of the data into a second plurality of codewords with a Reed-Solomon code having a second error correction capability.

In some implementations, codewords within the first plurality of codewords are interleaved with one another, and codewords within the second plurality of codewords are interleaved with one another.

In some implementations, the first at least one encoding scheme includes a trellis encoding scheme, a convolutional encoding scheme, or a punctured convolutional encoding scheme.

In some implementations, the control circuitry is further configured to store the signal vector in memory, where the memory may be a multilevel cell flash memory.

In some embodiments, a system for decoding received data is disclosed. The system includes receiver circuitry configured to decode a first portion of the received data using a first at least one decoding scheme. The decoded first portion may correspond to a coset in a plurality of cosets, and the plurality of cosets may correspond to a partition of a signal constellation. In some embodiments, the first at least one decoding scheme includes a first decoding scheme and a trellis decoding scheme. The receiver circuitry is further configured to re-encode the decoded first portion with a first at least one encoding scheme. The receiver circuitry is further configured to decode, using a second decoding scheme, a second portion of the received data based at least in part on the re-encoded first portion of the data. The decoded second portion may correspond to a signal vector within the coset.

In some implementations, the first at least one decoding scheme encodes the first portion with a Reed-Solomon Code having a first error correction capability. The second decoding scheme decodes the second portion with a Reed-Solomon Code having a second error correction capability.

In some implementations, the first error correction capability is greater than the second error correction capability.

In some implementations, the system includes transmitter circuitry configured to encode a first portion of data with the first at least one encoding scheme. The transmitter circuitry is further configured to encode a second portion of the data with a second encoding scheme. The transmitter circuitry is further configured to generate the received data based at least in part on the encoded first portion of the data and the encoded second portion of the data.

In some implementations, generating the received data includes selecting the coset from the plurality of cosets based at least in part on the encoded first portion of the data, and selecting the signal vector within the selected coset based at least in part on the encoded second portion of the data.

In some implementations, the first at least one encoding scheme includes a trellis encoding scheme, a convolutional encoding scheme, or a punctured convolutional encoding scheme.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative embodiments will now be described. However, the systems and methods described herein may be adapted and modified as is appropriate for the application being addressed and that the systems and methods described herein may be employed in other suitable applications, and that such other additions and modifications will not depart from the scope hereof.

As used herein, a "signal vector" refers to any signals or signal transmitted or received using either a modulation scheme with a one-dimensional (1D) constellation set (e.g., 8PAM) or a multi-dimensional signal constellation set (e.g., $(8PAM)^2$, $(8PAM)^4$, QAM). The term "signal vector" will be used regardless of whether the dimensions are implemented spatially, temporally, or in frequency.

A "signal level" refers to an amplitude, phase, or other value associated with a 1D signal or a 1D signal component of a multi-dimensional signal vector. A "signal constellation point" or a "signal point" refers to a signal level in a 1D signal constellation set or a 1D component of a multi-dimensional signal constellation set. Thus, an 8PAM signal constellation set has eight signal points, each having a different signal level.

Finally, a "signal point vector" refers to a multi-dimensional signal vector, where each component of the multi-dimensional vector is associated with a 1D signal constellation set and takes a value of a signal point in that 1D signal constellation set. Thus, a signal point vector for an $(8PAM)^4$ signal constellation set would include four dimensions, and each dimension would take on the value of an 8PAM signal point. Also, each signal vector transmitted or received in the digital communication or storage system may be derived from one of the signal point vectors based on the digital data that is conveyed or stored.

Figure 1:
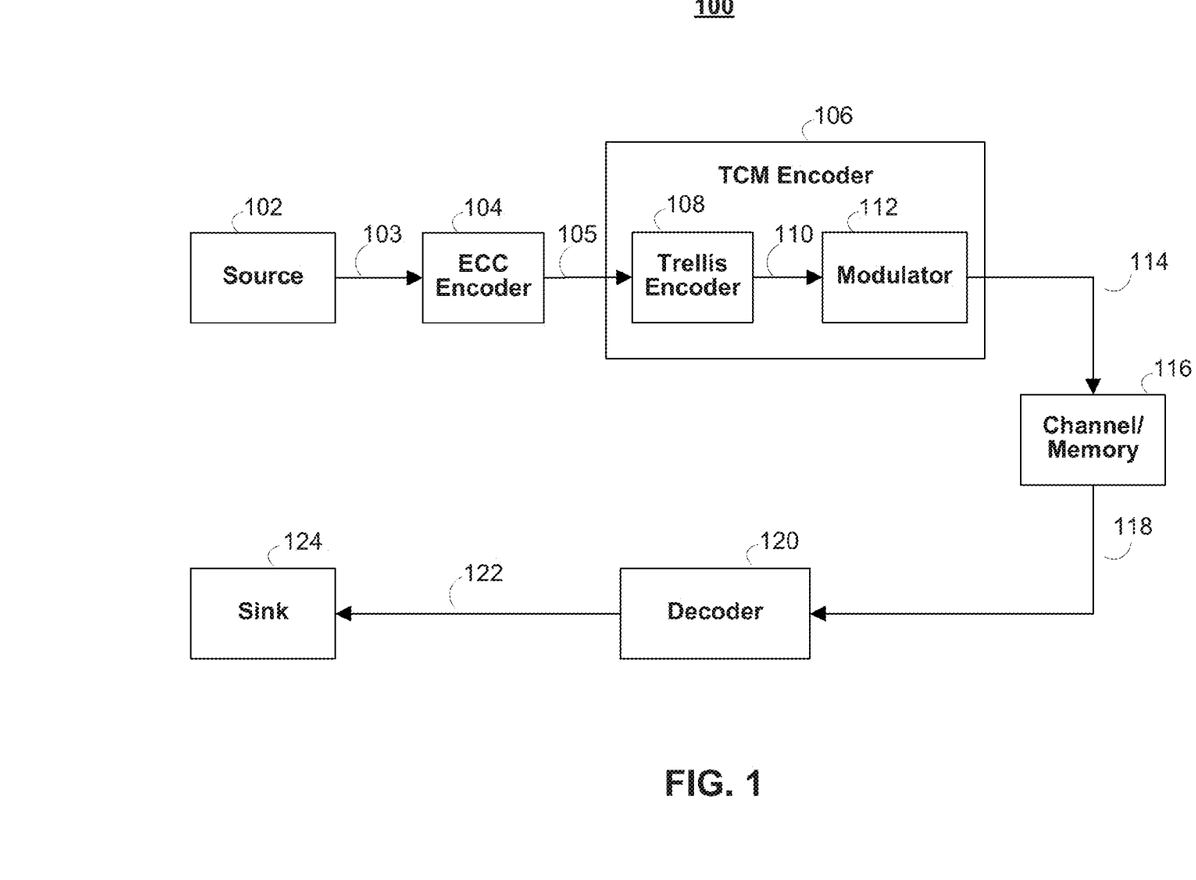
FIG. 1 shows a storage or communications system according to an embodiment of the present disclosure.

FIG. 1 shows a storage or communications system 100 according to an embodiment of the present disclosure. System 100 may be used to transfer user data 103 from source 102 to sink 124. The source 102 may be any suitable source that can provide the user data 103. The user data 103 provided from the source 102 to the sink 124 can represent any type of data to be conveyed (e.g., a sampled/quantized version of an analog signal, binary data, etc.) and can be in any suitable digital form (e.g., encoded data, uncoded data, etc.).

The user data 103 may be transferred from the source 102 to the sink 124 using one or more data carrying signals. The data-carrying signals may be transferred through a transmission or storage medium that degrades the signals. The effect of this signal-altering medium is represented in FIG. 1 by channel 116.

The channel 116 may represent any suitable storage medium in which the user data 103 is stored, such as a magnetic storage device (e.g., a hard disk), an electrical storage device (e.g., FLASH memory, RAM), or an optical storage device (e.g., a CD-ROM). In some embodiments, the channel 116 may represent a multi-level cell (MLC) NAND flash memory system. Alternatively, the channel 116 may represent any suitable wired or wireless transmission medium through which the user data 103 is conveyed. The communications or storage medium may also cause the data-carrying signals to be affected by additive signal-dependent or signal-independent noise.

Due to the effects of the channel 116 on the data-carrying signals, reliable data transfer may be obtained from an encoding portion of system 100 including the ECC encoder 104 and the TCM encoder 106, and a decoding portion of system 100 including decoder 120. The encoding portion of system 100 may prepare the user data 103 obtained from the source 102 for transmission through the channel 116, outputting a data-carrying signal or signal vector 114.

The ECC encoder 104 may encode the user data 103 based on any suitable error control (i.e., error-correcting and/or error-detecting) code, for example, convolutional or block code. For example, the ECC encoder 104 may encode the user data 103 using a convolutional code, a block code, a Reed-Solomon code, a Cyclical Error Correction (CRC) code, a Low Density Parity Check (LDPC) code, a Turbo code, or any other suitable code.

As used herein, a Reed-Solomon (RS) code is an error control code that encodes a sequence of data symbols by adding t check symbols to the sequence of data symbols. An RS code can detect any combination of up to t erroneous symbols, and correct up to [t/2] symbols. As an erasure code, an RS code can correct up to t known erasures and/or detect and correct combinations of errors and erasures. Furthermore, an RS code is suitable as multiple-burst bit-error correcting code, since a sequence of b+1 consecutive bit errors can affect at most two symbols of size b.

The ECC encoder 104 may engage in cooperative encoding with the TCM encoder 106 by encoding different portions of the user data 103 with different encoding schemes based on their functions within the TCM encoder 106. The FCC encoder 104 will be described in more detail below, in connection with FIG. 2.

The TCM encoder 106 may further encode at least a portion of coded data 105 provided by the ECC encoder 104 based on any suitable trellis or convolutional code. For example, the encoder 106 may encode the user data 103 based on a suitable rate-1/2 or rate-2/3 convolutional code. This function of TCM encoder 106 is embodied in encoder 108, which produces coded data sequence 110. In some embodiments, the encoder 108 may utilize a convolutional encoding scheme or a punctured convolutional encoding scheme. In some embodiments, the coded data sequence 110 is divided into codewords (i.e., TCM codewords). It should be noted that at least a portion of the coded data sequence 110 may be passed through the encoder 108 without being conventionally encoded. The uncoded portion may be combined at the output of the encoder 108 with the portion to which convolutional coding has been applied in order to produce a TCM codeword.

In addition to coding, the TCM encoder 106 may include modulator 112 for modulating the coded data sequence 110 (i.e., TCM codeword). The modulator 112 may convert the coded data sequence 110 to the signal or signal vector 114 based on a suitable modulation scheme. The modulation scheme applied by the modulator 112 to produce the signal or signal vector 114 may be a binary-level scheme, such as 2PAM, or a multi-level modulation scheme, such as 4PAM, 8PAM, 16PAM, or 64PAM. Other suitable modulation schemes that the TCM encoder 106 may utilize include an M-level QAM, PSK, or ODFM scheme. In general, the TCM encoder 106 may modulate the coded data 110 based on signal constellation sets of one or more dimensions (e.g., a 2D $(8PAM)^2$ set, a 4D $(8PAM)^4$ set). The dimensions can be implemented spatially (e.g., for MIMO systems), in frequency (e.g., orthogonal carrier frequencies), in time (e.g., sequentially), or using a combination of these.

The coding and modulation techniques implemented by the encoder 108 and the modulator 112, respectively, may be designed to operate effectively together. This design approach is typically referred to as coded modulation, and is a type of bandwidth efficient communication. That is, coded modulation may not require bandwidth expansion to maintain the same throughput as transferring uncoded user data, even though redundancy is added to the data stream. In some embodiments, rather than having a separate convolutional encoder and modulator, as shown in FIG. 1, a TCM encoder may integrate these functions into a single component. Also, although the TCM encoder 106 is shown to utilize trellis coded modulation, it should be understood that encoder 106 may alternatively utilize another bandwidth efficient technique.

With continuing reference to FIG. 1, because of the effects of channel 116, the signal or signal vector 118 received by decoder 120 may be a distorted or noisy version of the signal or signal vector 114. The decoder 120 may interpret the signal vector 118 and may attempt to recover the user data 103 from the signal vector 118. A decoder in accordance with an embodiment of the present disclosure will be further described in connection with FIG. 5.

Figure 2:
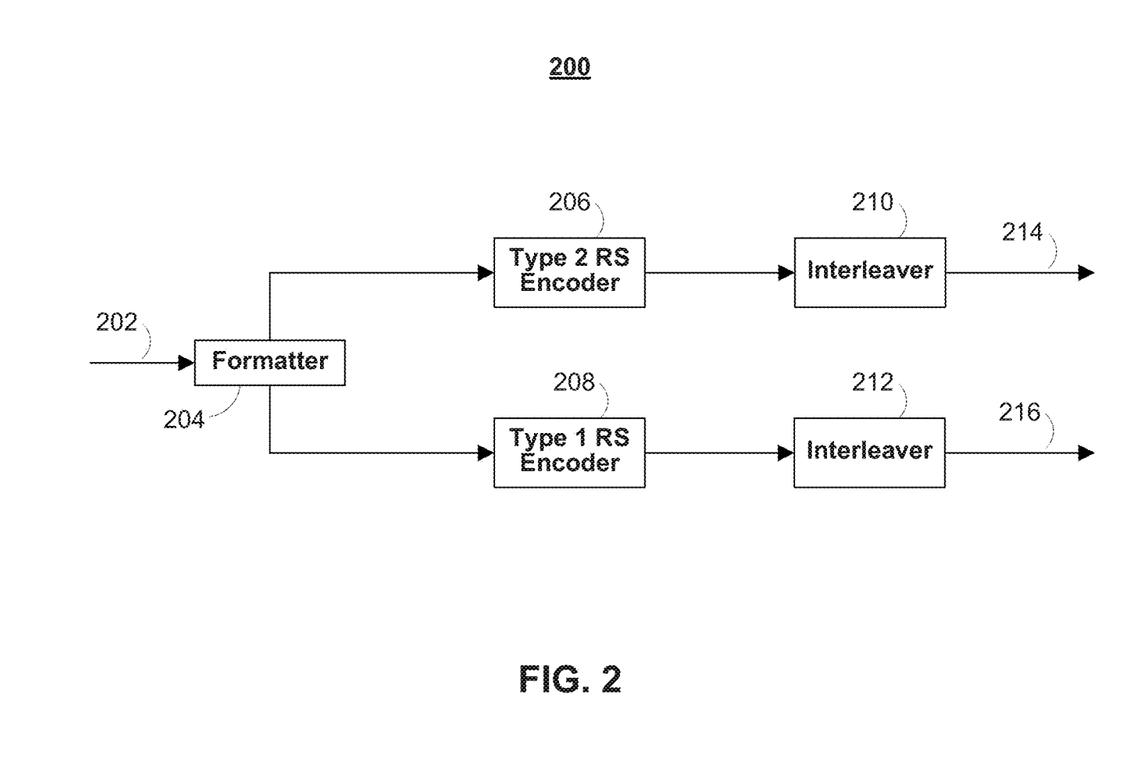
FIG. 2 shows an encoding system according to an embodiment of the present disclosure.

FIG. 2 shows an encoding system 200 according to an embodiment of the present disclosure. System 200 includes a formatter 204, encoders 206 and 208, and optional interleavers 210 and 212. In some embodiments, system 200 may be used to implement the ECC encoder 104 shown in FIG. 1. In these embodiments, system 200 may receive the user data 103 as data stream 202, and output the encoded data 105 as a combination of data streams 214 and 216.

The ECC encoder 104 (which may be represented by system 200) may engage in cooperative encoding with the TCM encoder 106 by encoding different portions of the user data 103 with different encoding schemes based on their functions within the TCM encoder 106. For example, the TCM encoder 106 may employ a communications or storage approach referred to as set partitioning. Set partitioning can refer to a technique that separates the signal points or signal point vectors (i.e., collectively, signal vectors) in a modulation scheme (e.g., the eight points in 8PAM) into separate groups. These groups may be referred to as cosets. For an 8PAM scheme, for example, the TCM encoder 106 may operate based on four cosets that each includes two signal points. To encode the coded user data 105 (i.e., a particular TCM codeword), the TCM encoder 106 may first select the coset that the coded user data 105 belongs in, and may then select the particular signal point (i.e., intra-coset point) from within the coset.

When the FCC encoder 104 and the TCM encoder 106 engage in cooperative encoding, the FCC encoder 104 may be used to encode portions of user data used to select the cosets using one encoding scheme, and separately encode portions of user data used to select the particular signal vectors within these cosets using another encoding scheme. In particular, when system 200 is used to implement the ECC encoder 104, system 200 may receive the user data 103 as the data stream 202. The formatter 204 may format the data stream 202 for encoding. The formatter 204 may also separate the formatted data stream into first portions used by the TCM encoder 106 to select the cosets, and second portions used by the TCM encoder 106 to select the particular signal vectors within these cosets. The formatter 204 may then pass the first data portions to the encoder 208 and pass the second data portions to the encoder 206.

The encoders 206 and 208 encode their received respective second and first data portions. It should be noted that although the encoders 206 and 208 of FIG. 2 will be described herein as Reed-Solomon encoders, each of the encoders 206 and 208 may implement any suitable error control (i.e., error-correcting and/or error-detecting) coding scheme. For example, each of the encoders 206 and 208 may encode their received respective second and first data portions using a convolutional code, a block code, a CRC code, an LDPC code, a Turbo code, or any other suitable code.

As described above, a Reed-Solomon code is an error control code that encodes a sequence of data symbols by adding t check symbols to the sequence of data symbols. The encoder 208 may use an RS scheme that adds $t_1$ check symbols, and the encoder 206 may use an RS scheme that adds $t_2$ check symbols. Advantageously, for a given a total allocation of K check (i.e., redundancy) symbols, system 200 may allocate $t_1$ check symbols to the encoder 208, and $t_2 = K - t_1$ check symbols to the encoder 206, thus providing the first and second portions of user data with different levels of error protection. In some embodiments, $t_1$ is greater than $t_2$, and thus the error protection provided to the first portions is greater than the error the protection provided to the second portions.

The encoder 208 may encode several first portions of user data as one RS codeword, which will sometimes be referred to as a Type 1 RS codeword (which provides a first error correction capability). Likewise, the encoder 206 may encode several second portions of user data as one RS codeword, which will sometimes be referred to as a Type 2 RS codeword (which provides a second error correction capability). It should be noted that each respective first portion and second portion of the user data is used by the encoder 106 to generate a respective TCM codeword 110. Optionally, several Type 1 RS codewords may be interleaved with one another using the interleaver 212. Likewise, several Type 2 RS codewords may be interleaved with one another using the interleaver 210. The optionally interleaved Type 1 RS codewords are output as data streams 216, and the optionally interleaved Type 1 RS codewords are output as data stream 214.

Figure 3:
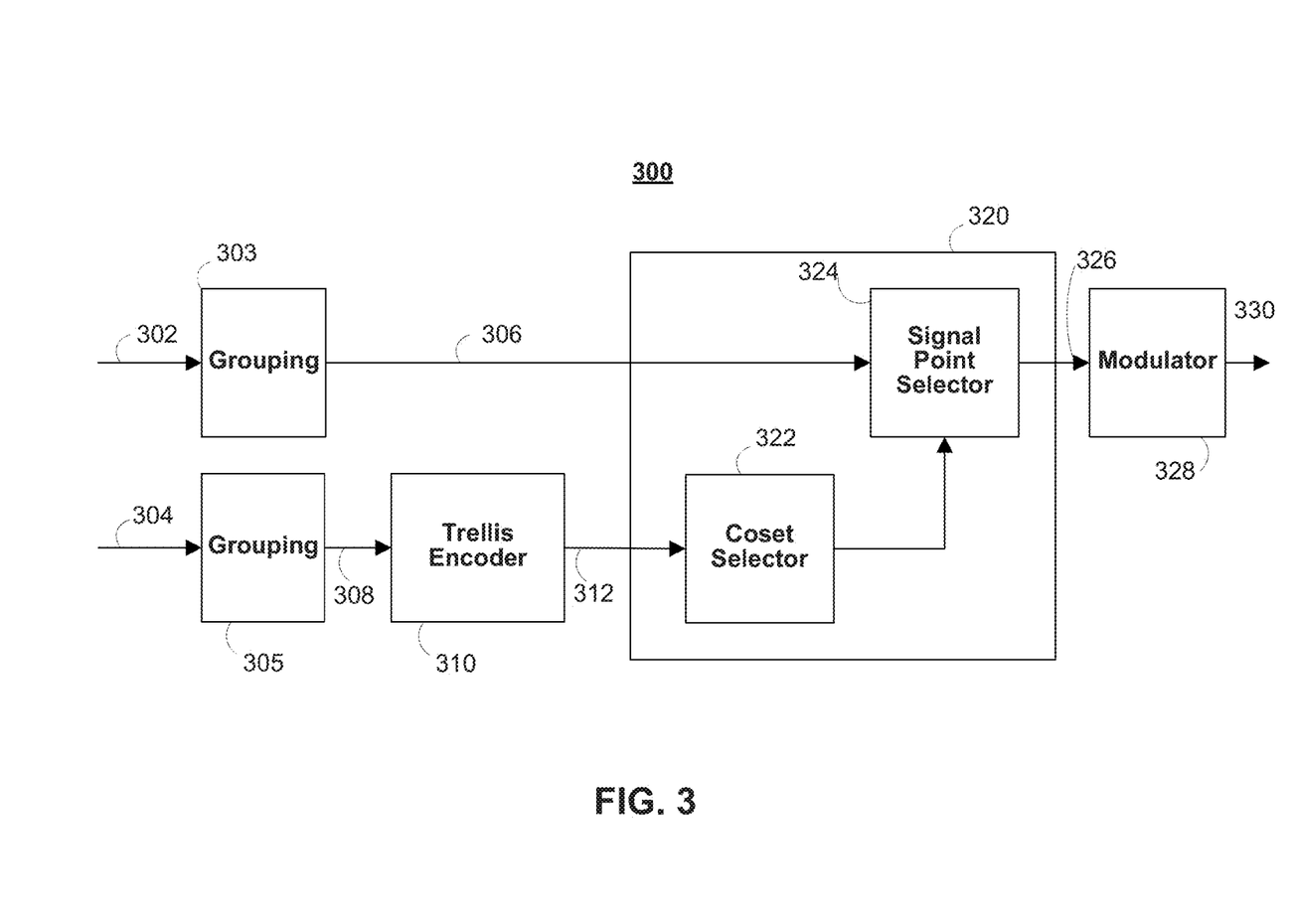
FIG. 3 shows a further encoding system according to an embodiment of the present disclosure.

FIG. 3 shows an encoding system 300 according to an embodiment of the present disclosure. In some embodiments, encoding system 300 may be used to implement the TCM encoder 106 shown in FIG. 1.

In some embodiments, encoding system 300 may receive, as input data 302, the encoded second portion of the user data 214 output by system 200. Encoding system 300 may also receive, as input data 304, the encoded first portion of the user data 216 output by system 200. Encoding system 300 may convert the input data 302 and 304 into one or more corresponding signal vectors 326. The signal vectors 326 may be modulated by modulator 328 using a single or multi-dimensional modulation scheme. Encoding system 300 may also include grouping elements 303 and 305, trellis encoder 310 and signal mapper 320, where the signal mapper 320 in turn can include coset selector 322 and signal vector selector 324.

Encoding system 300 can convert the input data 303 and 305 to signals based on a set partitioning approach. The input data 302 and 304 may be appropriately grouped using grouping elements 303 and 305, respectively. In particular, grouping elements 303 and 305 may group the input data into groups having sizes based on the operating parameters (e.g., code rate, ratio of coded bits to uncoded bits, etc.) of the trellis encoder 310. The grouped bits 308 (corresponding to the coded first portions of the user data) may be encoded by the trellis encoder 310, which may encode the data based on any suitable convolutional code (e.g., rate-1/2, rate-2/3, rate-3/5 convolutional code, and so on). In some embodiments, the trellis encoder 310 can encode the data based on a punctured convolutional code. The resulting encoded data 312, as well as grouped data 306 (corresponding to the coded first portions of user data), may be provided to the signal mapper 320. Together the bits provided to the signal mapper 320 form the above-referenced TCM codeword.

The coset selector 322 may identify a coset based on the encoded bits 312 obtained from the trellis encoder 310. Thus, the greater the number of coded bits provided to the coset selector 322, the greater the number of cosets that the coset selector 322 can select from. Using the coset selected by the coset selector 322, the signal point selector 324 may identify a signal point or signal point vector in the coset from the bits 306. Thus, similarly, the greater the number of the bits 306 that are not encoded by the trellis encoder 310, the greater the number of signal points/signal point vectors there may be in each coset. The signal point selector 324 may then provide vector outputs that may be referred to as being in a channel domain. The signal point selector 324 may provide multiple vector outputs, where each output may correspond to a different binary or multi-level signal. For example, each vector output may be a three-bit output that can be converted by the modulator 326 into modulated signal 330, such as e.g., an 8PAM signal or one dimension of an $(8PAM)^4$ signal vector.

Figure 4:
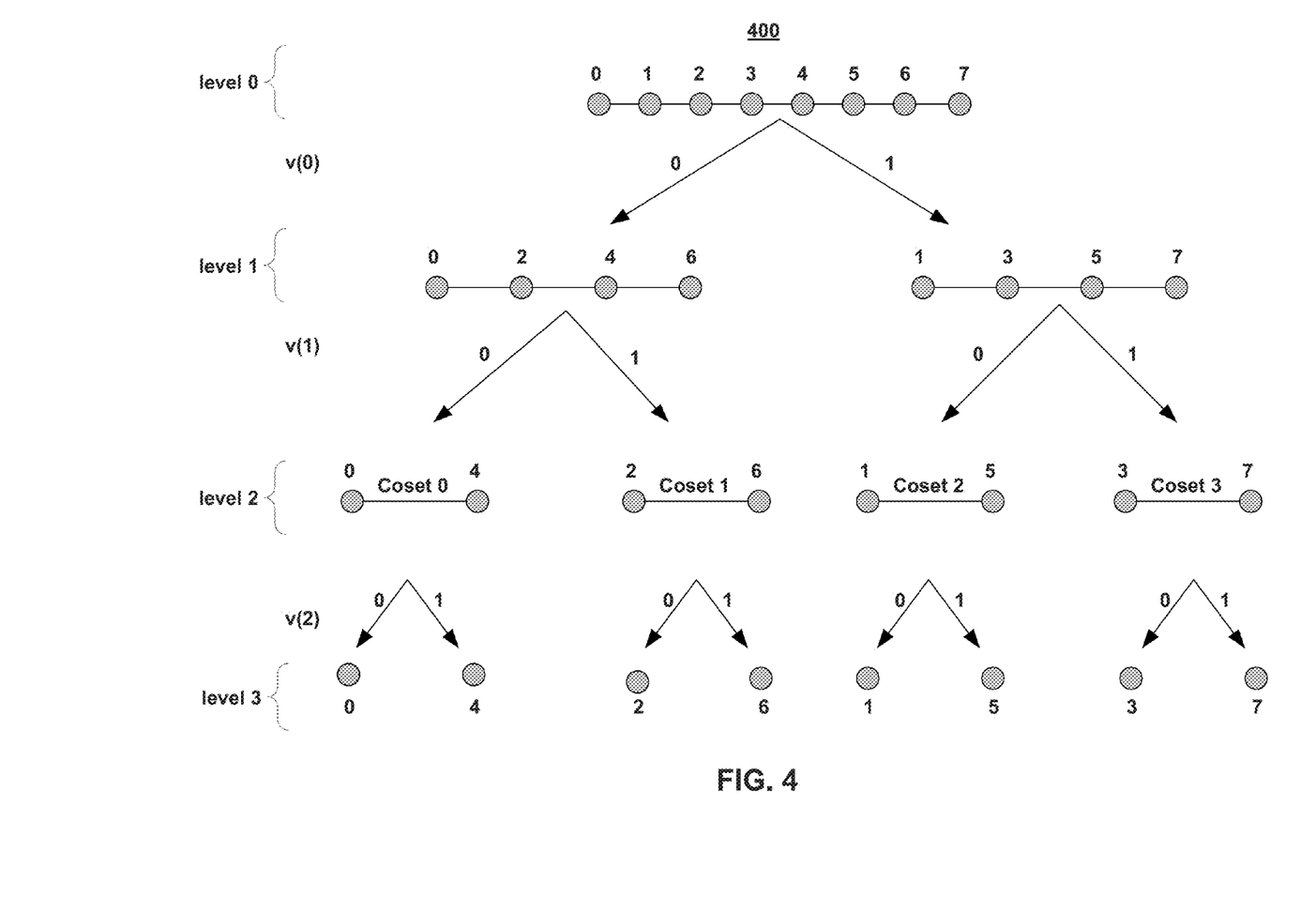
FIG. 4 shows a tree diagram 400 that illustrates a set partitioning according to an embodiment of the present disclosure.

FIG. 4 shows a tree diagram 400 that illustrates a set partitioning scheme according no an embodiment of the present disclosure. Tree diagram 400 may represent the set partitioning approach employed by encoding system 300 of FIG. 3 to obtain the signal vector 326. Although the set portioning approach will be discussed with reference to an 8PAM signal, it should be appreciated that the set partitioning approach may be applied to any suitable modulation scheme, as described above.

In some embodiments, tree diagram 400 may represent the set partitioning approach employed by encoder 300 of FIG. 3 to obtain an 8PAM signal. In these embodiments, tree diagram 400 illustrates a scenario where bits v(0) and v(1) (corresponding to the output 312 of the convolutional encoder 310, i.e., the encoded first portion of the user data) are used to select a coset, and bit v(2) (corresponding to the data 306, i.e., the second portion of the user data) is used to select a signal point within the selected coset. Tree diagram 400 may include four levels, level 0 through level 3. Level 0 includes all eight signal points of the 8PAM signal set, labeled as signal points 0 through 7 from the leftmost signal point to the rightmost signal point. The 8PAM signal set is repeatedly divided in successive levels, producing an increasing number of cosets at each stage and with increasing Euclidean distance (or squared Euclidean distance) between the signal points. For example, the intra-coset distance between neighboring points 0 and 1 in a coset of level 0 may be $\|1-0\|^2=1$, while the intra-coset distance between neighboring points 0 and 2 of level 1 may be $\|2-0\|^2=4$.

The values of v(0) and v(1), which may be outputs of convolutional code encoder 310 of FIG. 3, can specify a particular path through tree diagram 400 to a particular coset in level 2. Thus, based on these values, one of the four cosets, coset 0 through coset 3, may be selected. For example, if v(0)=0 and v(1)=1, coset 1 may be selected. If v(0)=1 and v(1)=0, coset 2 may be selected. This selection process may represent the operations performed by the coset selector 322 of FIG. 3. Thus, as described above, the coset selector 322 may effectively select one of the four cosets in FIG. 4 by traversing a path through a tree diagram such as tree diagram 400.

With continued reference to FIG. 4, bit v(2) may be used to select a signal point from the selected coset. That is, the values of v(0) and v(1) may bring the path through tree diagram 400 to a coset in level 2, while the value of v(2) may allow the path to continue to a signal point in level 3. This selection operation may represent the operation performed by the signal point selector 324, described above in connection with FIG. 3. Thus, as described above, the signal point selector 324 may effectively select a signal point by completing a gash through a tree diagram, such as tree diagram 400. Each selected signal point thus corresponds to a unique triplet {v(0),v(1),v(2)} (i.e., TCM codeword).

During decoding, a decoder 120 may make three types of errors: coset errors, intra-coset errors, and coset+intra-coset errors. The coset errors are due to the bits v(0) and v(1) (i.e., the coset bits), which are used to select the coset for a particular signal constellation. During decoding, the coset bits v(0) and v(1), which have been encoded using the convolutional encoder 310, are decoded using a convolutional decoder, such as a Viterbi decoder. Due to its structure, a convolutional decoder may make burst errors (i.e., errors involving multiple consecutive decoded bits). In contrast, intra-coset errors, are due to v(2) (i.e., the intra-coset bit), which is used to select the signal point within the coset. Intra-coset errors tend to be randomly distributed across decoded data. Because of the increasing distance properties of the signal point mapping, as described above, the coset errors may dominate the error statistics. Furthermore, coset errors may also cause intra-coset errors, leading to coset+intra-coset errors.

Advantageously, as described in connection with FIG. 4, because the user data bits (i.e., the first portions of the user data) corresponding to coset bits are encoded separately from the user data bits (i.e., the second portions of the user data) corresponding to the intra-coset bits using the encoders 208 and 206, respectively, a total allowed redundancy (and therefore, a total allowed amount of error protection) of K bits may be allocated to favor the coset bits. Such an allocation may reduce the number of the coset errors, and subsequently reduce the number of the coset+intra-coset errors. Since the coset errors may dominate the error statistics, such a reduction may improve system performance, both by an absolute measure and when compared against a scheme that jointly encodes the coset and intra-coset bits with the same redundancy of K bits prior to TCM encoding.

Figure 5:
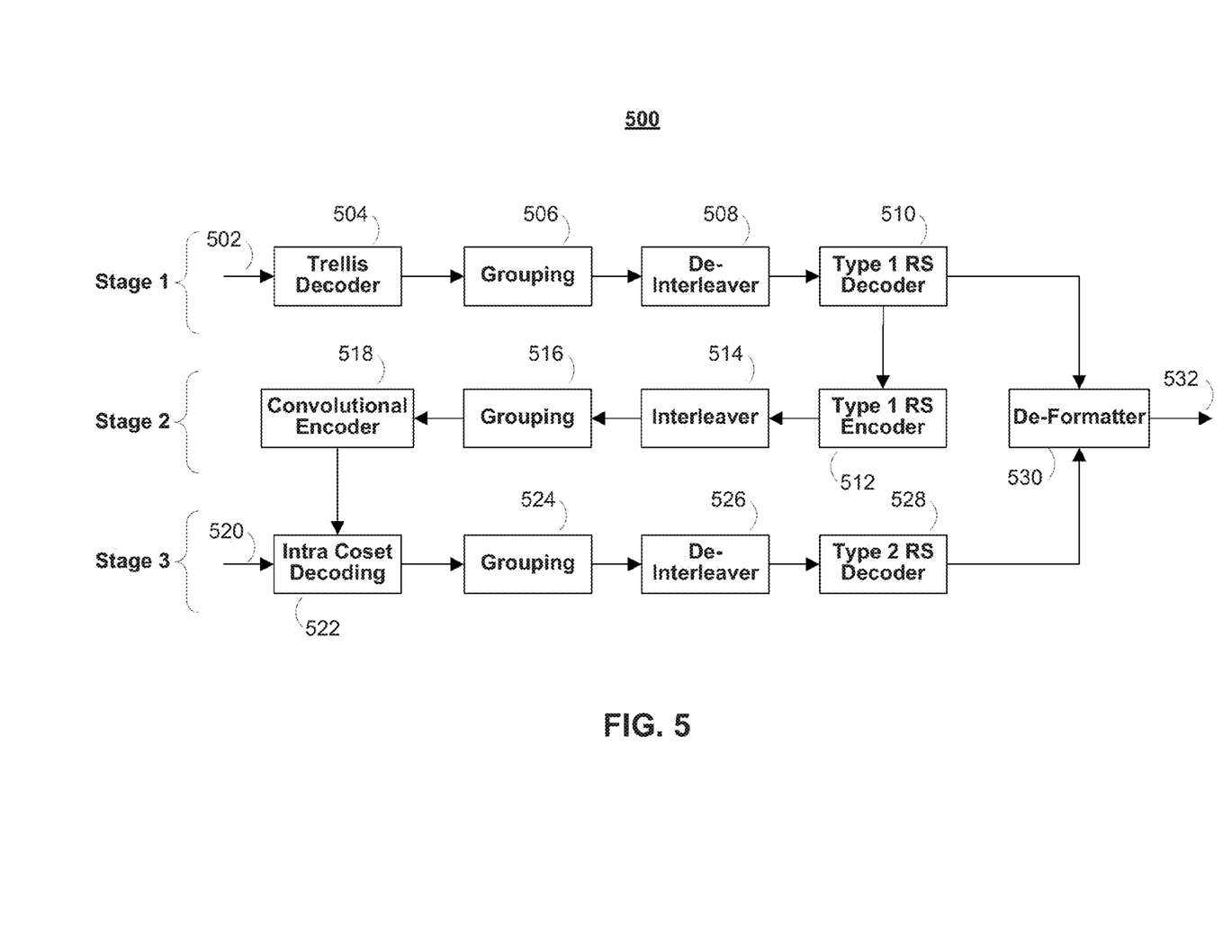
FIG. 5 shows a decoding system according to an embodiment of the present disclosure.

FIG. 5 illustrates a decoding system 500 according to an embodiment of the present disclosure. In some embodiments, decoding system 500 may be used to implement the decoder 120 shown in FIG. 1.

Decoding system 500 may receive a signal vector 118 transmitted by or stored within the channel/memory 116 as input data 502 and 520. Because of the effects of channel 116, signal vector 118 received by decoding system 500 may be a distorted or noisy version of signal vector 118. Decoding system 500 may interpret signal vector 118 and may attempt to recover user information 103 from signal vector 118. Estimate 526 of decoding system 500 may be any suitable estimate of user information 103. To obtain the estimate 526, decoding system 500 may include a quantizer (not shown) and a trellis decoder 504. The quantizer and the trellis decoder 504 may be matched to their corresponding components in the encoder 106 of FIG. 1. For example, if the trellis encoder 108 is a rate-1/2 convolutional code encoder, the trellis decoder 504 may be a Viterbi-based decoder matched to the rate-1/2 convolutional code.

The quantizer may quantize the received modulated signal vector 118 to obtain a digital representation of the signal. Additional circuitry (not shown) may separate the output of the quantizer into data 502 corresponding to the coset bits of a transmitted TCM codeword, and data 520 corresponding to the intra-coset bits of the transmitted TCM codeword. The trellis decoder 504 may decode the received data 502. The decoded coset bits output by the trellis decoder 504 may have been encoded as Type 1 RS codewords during encoding by encoder 208 of FIG. 2. Accordingly, the decoded coset bits may be grouped by grouping element 506 into groups based on a block length of a Type 1 RS codeword. The grouped coset bits output by the grouping element 506 may then optionally be de-interleaved by de-interleaver 506 if interleaving (e.g., via interleaver 212) was performed during encoding. The coset bits are then decoded by decoder 510, which may be matched to the corresponding encoder 208. In conjunction, the trellis decoder 504 and the decoder 510 may correct errors introduced into the data during transmission/storage. Accordingly, an estimate of the transmitted first portions of user data may be obtained. Collectively, processing of the received data 502 (i.e., received coded coset bits) by the elements 504, 506, 508 and 510 of system 500 may be referred to as Stage 1 of a multi-stage decoding scheme according to an embodiment of the present disclosure.

The estimate of the transmitted first portions of user data may then be re-encoded using encoder 512, which may use the same encoding scheme as encoder 208 of FIG. 2. The re-encoded data may then optionally he interleaved, grouped by the grouping element 516 into groups of bits appropriate for convolutional encoding, and convolutionally encoded by convolutional encoder 518 in order to produce a version of the received coded coset bits 502 to which error correction has been applied. Collectively, processing of the estimated first portions of user data (i.e., the output of the decoder 510) by the elements 512, 514, 516 and 518 of system 500 may he referred to as Stage 2 of the multi-stage decoding scheme according to an embodiment of the present disclosure.

The intra-coset decoding element 522 may use the error-corrected coset bits output by the encoder 518 in order to decode the received coded intra-coset bits 520. The decoded intra-coset bits output by the intra-coset decoding element 522 may have been encoded as Type 2 RS codewords during encoding by encoder 206 of FIG. 2. Accordingly, the decoded intra-coset bits may be grouped by grouping element 524 into groups based on a block length of the Type 2 RS codeword. The grouped intra-coset bits output by the grouping element 524 may then be optionally de-interleaved by de-interleaver 526 if interleaving (e.g., via interleaver 210) was performed during encoding. The intra-coset bits are then decoded by decoder 528, which may be matched to the corresponding encoder 206. In conjunction, the intra-coset decoding element 522 and the decoder 528 may correct errors introduced into the data during transmission or storage. Accordingly, an estimate of the transmitted second portions of user data may be obtained. Collectively, processing of the received intra-coset bits 520 by the elements 522, 524, 526 and 528 of system 500 may he referred to as Stage 3 of the multi-stage decoding scheme according to an embodiment of the present disclosure.

The estimated first and second portions of user data output by the decoders 510 and 528, respectively, may be passed to de-formatter 530. The de-formatter 530 may be matched to the corresponding formatter 204 of FIG. 2. The de-formatter 530 may combine the estimated first and second portions of user data, format them using any suitable scheme, and output them as an estimate 532 of the user data 103.

Advantageously, as described in connection with FIG. 4, because the user data bits (i.e., the first portions of the user data) corresponding to coset bits are encoded separately from the user data bits (i.e., the second portions of the user data) corresponding to the intra-coset bits using the encoders 208 and 206, respectively, a total allowed redundancy (and therefore, a total allowed amount of error protection) of K redundancy bits may be allocated to favor the coset bits. For example, since the symbol error rate for intra-coset errors may be very small, a Type 2 RS code having around 10 check bits $t_2$ may be sufficient for a large range of TCM coding rates. Accordingly, $t_1 = K - t_2$ (where K may be greater than 20 bits) check/redundancy bits may be allocated to Type 1 codewords. Such an allocation may reduce the number of the coset errors, and subsequently reduce the number of the coset+intra-coset errors. Since the coset errors may dominate the error statistics, such a reduction may improve system performance, both by an absolute measure and when compared against a scheme that jointly encodes the coset and intra-coset bits with the same redundancy of K bits prior to TCM encoding.

Figure 6:
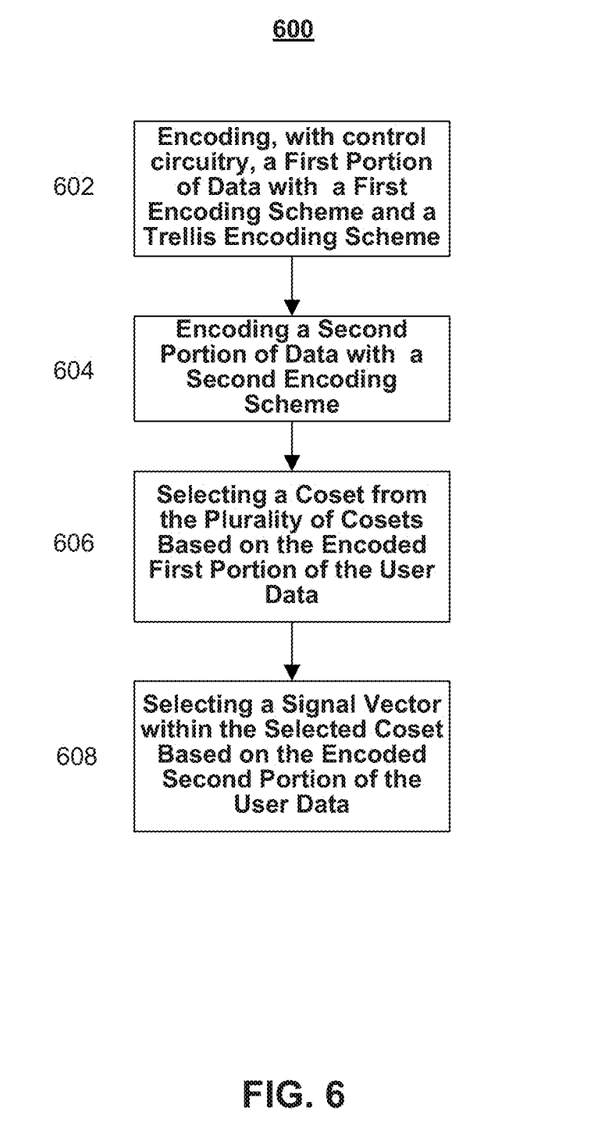
FIG. 6 shows an illustrative process 600 for encoding user data according to an embodiment of the present disclosure.

FIG. 6 shows an illustrative process 600 for producing trellis coded modulation data from user data according to an embodiment of the present disclosure.

At 602, control circuitry is used to encode a first portion of the user data using a first encoding scheme. In some embodiments, the first encoding scheme may be an RS encoding scheme.

At 604, a second portion of the user data is encoded using a second encoding scheme and a trellis encoding scheme. In some embodiments, the second encoding scheme may be an RS encoding scheme, and the trellis encoding scheme may be a convolutional encoding scheme. In some embodiments, encoding of the second portion of the user data using the second encoding scheme may be followed by further encoding the encoded second portion with the trellis encoding scheme.

At 606, a coset is selected from a plurality of cosets based at least in part on the encoded first portion of the user data. The plurality of cosets may correspond to a partition of a signal constellation subsequently used to transmit the user data.

At 608, a signal vector within the selected coset is selected based at least in part on the encoded second portion of the user data.

Process 600 of FIG. 6 is merely illustrative. Any steps in process 600 may be modified (e.g., performed in a different order), combined, or removed, and any additional steps may be added to process 600, without departing from the scope of the present disclosure.

The foregoing is merely illustrative of the principles of this disclosure and various modifications can be made without departing from the scope of the present disclosure. The above described embodiments of the present disclosure are presented for purposes of illustration and not of limitation, and the present disclosure is limited only by the claims which follow.

What is claimed is:

1. A method for encoding data, the method comprising:
    encoding, with control circuitry, a first portion of the data with a first at least one encoding scheme using t1 redundancy bits;
    encoding a second portion of the data with a second encoding scheme using t2 redundancy bits, wherein t1 is greater than t2 such that the first portion of the data is encoded with a higher level of Reed Solomon encoding than the second portion of the data, and K is a total allowed number of redundancy bits allocated to the first at least one encoding scheme and the second encoding scheme and is equal to the sum of t1 and t2;
    selecting a coset from a plurality of cosets having a same intra-coset distance, based at least in part on the encoded first portion of the data with the higher level of Reed Solomon encoding, wherein the plurality of cosets corresponds to a partition of a signal constellation; and
    selecting a signal vector within the selected coset based at least in part on the encoded second portion of the data.

2. The method of claim 1, wherein:
    the first at least one encoding scheme encodes the first portion with a Reed-Solomon Code having a first error correction capability; and
    the second encoding scheme encodes the second portion with a Reed-Solomon Code having a second error correction capability.

3. The method of claim 2, wherein the first error correction capability is greater than the second error correction capability.

4. The method of claim 1, wherein:
    the first at least one encoding scheme encodes the first portion of the data into a first plurality of codewords with a Reed-Solomon code having a first error correction capability, and
    the second encoding scheme encodes the second portion of the data into a second plurality of codewords with a Reed-Solomon code having a second error correction capability.

5. The method of claim 4, wherein:
    codewords within the first plurality of codewords are interleaved with one another, and
    codewords within the second plurality of codewords are interleaved with one another.

6. The method of claim 1, wherein the first at least one encoding scheme comprises a trellis encoding scheme, a convolutional encoding scheme, or a punctured convolutional encoding scheme.

7. The method of claim 1, further comprising storing the signal vector in memory, wherein the memory is a multilevel cell flash memory.

8. A system for encoding data, the system comprising control circuitry configured to:
    encode a first portion of the data with a first at least one encoding scheme using t1 redundancy bits;
    encoding a second portion of the data with a second encoding scheme using t2 redundancy bits, wherein t1 is greater than t2 such that the first portion of the data is encoded with a higher level of Reed Solomon encoding than the second portion of the data, and K is a total allowed number of redundancy bits allocated to the first at least one encoding scheme and the second encoding scheme and is equal to the sum of t1 and t2;
    select a coset from a plurality of cosets having a same intra-coset distance, based at least in part on the encoded first portion of the data with the higher level of Reed Solomon encoding, wherein the plurality of cosets corresponds to a partition of a signal constellation; and
    selecting a signal vector within the selected coset based at least in part on the encoded second portion of the data.

9. The system of claim 8, wherein:
    the first at least one encoding scheme encodes the first portion with a Reed-Solomon Code having a first error correction capability; and
    the second encoding scheme encodes the second portion with a Reed-Solomon Code having a second error correction capability.

10. The system of claim 9, wherein the first error correction capability is greater than the second error correction capability.

11. The system of claim 8, wherein:
    the first at least one encoding scheme encodes the first portion of the data into a first plurality of codewords with a Reed-Solomon code having a first error correction capability, and
    the second encoding scheme encodes the second portion of the data into a second plurality of codewords with a Reed-Solomon code having a second error correction capability.

12. The system of claim 11, wherein:
    codewords within the first plurality of codewords are interleaved with one another, and
    codewords within the second plurality of codewords are interleaved with one another.

13. The system of claim 8, wherein the first at least one encoding scheme comprises a trellis encoding scheme, a convolutional encoding scheme or a punctured convolutional encoding scheme.

14. The system of claim 8, wherein the control circuitry is further configured to store the signal vector in memory, wherein the memory is a multilevel cell flash memory.

15. A system for decoding received data, the system comprising receiver circuitry configured to:
    decode a first portion of the received data using a first at least one decoding scheme, wherein:
    the first portion encoded using t1 redundancy bits;
    the decoded first portion corresponds to a coset in a plurality of cosets, and
    the plurality of cosets corresponds to a partition of a signal constellation;
    re-encode the decoded first portion with a first at least one encoding scheme;
    and decode, using a second decoding scheme a second portion of the received data based at least in part on the re-encoded first portion of the data, wherein:

the second portion is encoded using the t2 redundancy bits;

t1 is greater than t2 such that the first portion is encoded with a higher level of Reed Solomon encoding than the second portion;

K is a total allowed number of redundancy bits allocated to the first portion and the second portion and is equal to the sum of t1 and t2; and the decoded second portion corresponds to a signal vector within the coset.

16. The system of claim 15, wherein:

the first at least one decoding scheme decodes the first portion with a Reed-Solomon Code having a first error correction capability; and the second decoding scheme decodes the second portion with a Reed-Solomon Code having a second error correction capability.

17. The system of claim 16, wherein the first error correction capability corresponds to a first number of redundancy bits and the second error correction capability corresponds to a second number of redundancy bits that is less than the first number of redundancy bits.

18. The system of claim 15, further comprising transmitter circuitry configured to: encode a first portion of data with the first at least one encoding scheme; encode a second portion of the data with a second encoding scheme; and generate the received data based at least in part on the encoded first portion of the data and the encoded second portion of the data.

19. The system of claim 18, wherein the generating the received data comprises:

selecting the coset from the plurality of cosets based at least in part on the encoded first portion of the data; and selecting the signal vector within the selected coset based at least in part on the encoded second portion of the data.

20. The system of claim 15, wherein the first at least one encoding scheme comprises a trellis encoding scheme, a convolutional encoding scheme, or a punctured convolutional encoding scheme.

* * * * *